Patented July 7, 1953 2,644,787

UNITED STATES PATENT OFFICE 2,644,787

ELECTRODEPOSITION OF A MAGNETIC COATING

Theodore H. Bonn, Philadelphia, and Douglas Cary Wendell, Jr., Bryn Mawr, Pa., assignors to Eckert-Mauchly Computer Corporation, Philadelphia, Pa., a corporation of Pennsylvania No Drawing. Application January 5, 1950, Serial No. 137,028

12 Claims. (Cl. 204—43)

This invention relates to the manufacture of magnetic record carriers such as wires or tapes and is particularly concerned with a plating process for manufacturing such elements.

Attempts have heretofore been made to produce magnetic carriers for recording purposes by plating bronze or brass tapes with a thin coating of a cobalt-nickel alloy. Such magnetic carriers, however, have had certain disadvantages, in that, in order to provide the necessary properties in the magnetic coating, heat treatment has been required which results in non-uniformity in the final product. In accordance with the present invention there is produced by a novel plating process a deposit of magnetic material which has, without the necessity for subsequent heat treatment, the desired magnetic properties of high coercivity and substantial remanence and at the same time excellent physical properties such as adherence to the base material, a bright and smooth surface and great hardness as well as high resistance to corrosion.

In brief, the improved process involves a combination of electroplating and chemical plating effected through the use of a bath containing nickel, cobalt and hypophosphite ions. Through the use of this process a very thin uniform coating, for example, having a thickness of 0.0002 inch may be deposited on a non-magnetic brass, bronze, or other non-magnetic metal tape, which tape itself may be quite thin, for example, having a thickness of 0.002 inch. The plating may be produced on magnetic tape but the tape should be non-magnetic for best results in recording and play-back. While, of course, these figures may be varied, it may be pointed out that a very thin coating is particularly desirable for good pulse resolution, for example, in a computing mechanism in which it is desirable to conserve tape length and operate a tape at relatively low speeds in the recording and reproducing of pulses. Thicker coatings are, of course, permissible where ordinary sound recording is involved unless good recording of high frequencies is to be produced. While the invention is particularly applicable to the formation of tapes for multiple channel recording it will be obvious that the invention is applicable to the plating of wires or other carriers such as cylinders or discs. To simplify the description, it will be directed to tapes, with the understanding that other carriers may be correspondingly coated with obvious changes in handling to suit their characteristics.

In carrying out the invention the carrier, which may be made of a great variety of non-magnetic materials, such as brasses or bronzes, is made the cathode in a bath which will be described hereafter in detail. Since for the securing of thin deposits only a short period of exposure as cathode in the bath is required the process may be made a continuous one by causing the tape to move through the bath with electrical contact with one or more rollers to supply the current to tape. One or more anodes are provided in the bath, which anodes may be formed of nickel, cobalt or nickel-cobalt alloys, or of platinum or some other metal which will either replenish the ions in solution or have no effect upon the ion content. Desirably, of course, the anode should be such as not to introduce deleterious cations into the solution as will be described more fully hereafter. While in accordance with what has been stated an electrolytic plating set-up is provided, the process is not strictly an electroplating one since deposition (including liberation of hydrogen) in excess of that to be expected from the current flow is produced by a reducing action on the metallic salts which are present in the bath.

While the process may be carried out at ordinary room temperatures it is desirable, for uniformity of results and also to accelerate the process, to heat the bath to maintain a constant temperature of the order of 45 to 55° C. This temperature, however, is not critical and either higher or lower temperatures may be maintained. An upper limit of about 80° C. is imposed by the fact that above this temperature the hypophosphite may produce spontaneous reduction throughout the bath.

It is, of course, necessary that the metallic carrier to be plated should be clean and this may be effected through the use of the conventional methods well known in the plating industry.

The solution which is used may be best described by reference to the ion concentrations of the essential constituents thereof. Broadly stated, the baths which may be used may be 0.2N to 1.7N bivalent nickel ion content, 0.2N to 1.00N in bivalent cobalt ion content and 0.04N to 0.20N in hypophosphite ion ($H_2PO_2$) content. The above ranges are not, however, critical and it will be understood that greater or less normalities of these ion contents may exist depending entirely on the properties of the coating which is to be produced.

It may be here noted that the normalities here indicated are in terms of the usual ones for the ions, i. e., a bath normal in nickel or cobalt ion would contain one-half a gram atomic weight of the nickel or cobalt per liter, while the bath normal in hypophosphite ion content would contain one gram molecular weight of hypophosphite radical ($H_2PO_2$) per liter. It is further to be understood that the contents of ions referred to signify the total of the metals or hypophosphite group present without implying that the normalities given represent total dissociation of the salts which contain these ions.

In addition to these ions the baths which may be used desirably contain other salts which contribute to increasing the conductivity such as sodium, ammonium or potassium chlorides, acetates, sulfates, citrates, or the like. The amounts of these salts present do not appear to be at all critical and as an example there may be cited the presence in the bath of ammonium chloride in ranges from 0.3 to 3.0 molar concentrations. Other salts, such as those mentioned, may be substituted in concentrations to give equivalent electrical conductivities.

The anions which are present, due to the acid radicals of the nickel and cobalt salts, are relatively immaterial and there may be involved one or more of such anions as chloride, sulfate, acetate, or the like. There are, of course, to be avoided the introduction of such anions as will precipitate the nickel or cobalt.

While in accordance with the above a large variety of anions may be present there are certain other ions, notably the nitrate ion, which should be excluded. If substantial amounts of nitrate ions are present the solution fails to operate properly. Generally speaking, non-essential constituents, which would oxidize hypophosphites, should be absent.

The hypophosphite may be introduced in the form of any of the alkali salts such as sodium, potassium or ammonium hypophosphite, but since no advantage is gained by using other than the least expensive sodium hypophosphite, $$(NaH_2PO_2.H_2O)$$

this is desirably used.

While, generally, no major advantages are gained by adding heavy metal cations other than nickel and cobalt, minor amounts of various metals such as iron, manganese, magnesium, zinc and lead may be tolerated. Addition of lead produces a smoother deposit, and the addition of small quantities of iron increases the remanence of the plating. The heavy metals may be introduced without harm in the way of impurities from impure anodes during the process. However, it is desirable to keep these at a minimum and, in particular, to avoid, to as great an extent as possible, metals which may be deposited as readily as, or more readily than, nickel and cobalt to avoid contamination of the coating. In general, it may be stated that the further any contaminating cations present lie above nickel and cobalt in the electromotive series the greater becomes the amount of that cation which may be present before the bath becomes unsatisfactory.

The current density involved in the deposition is not critical and may range, for example, from 10 to 200 amperes per square foot surface area of the carrier undergoing, at any instant, treatment in the bath. The higher current densities, however, involve losses due to hydrogen bubbling, though the bubbling, unless quite excessive, does not appear to have a deleterious effect on the coating. In general, it is desirable to operate at current densities ranging from 30 to 80 amperes per square foot.

The pH of the bath may lie within a rather broad range, i. e., 2 to 6, but best results are secured within the range of 3.0 to 4.2. To attain this range, if it is not secured originally by the admixture of the constituents, an acid, such as hydrochloric, sulfuric or acetic acid, or other acid compatible with the constituents of the bath, or an alkali, such as ammonium hydroxide, may be added to cause the pH to fall in the desired range. Potassium or sodium hydroxide may be used, but unless added cautiously with stirring they may cause local precipitation of the metallic hydroxides which redissolve with difficulty.

While considerable ranges of the various essential constituents of the bath may be used as indicated above consistent with obtaining values of coercivity in excess of 400 oersteds, it is usually desirable to obtain a maximum coercivity and there may be cited a specific bath composition which will produce a coercivity of approximately 810 oersteds. A bath producing a coating having this value of coercivity was 0.84N in nickel, 0.84N in cobalt, and 0.145N in hypophosphite ions. This bath contained ammonium chloride in 1.9 molar concentration. The anion associated with the nickel and cobalt was chloride and the hypophosphite was introduced in the form of the sodium salt. A remanence of the order of 10,000 gauss was secured in this case. The bath was used at a temperature of 50° C. with a current density of 50 amperes per square foot. The pH was approximately 4. The coating so obtained contained approximately 75% cobalt and 25% nickel.

Quite high values of coercivity of the same general magnitude may be obtained by varying the nickel ion content to the extent of plus or minus 15% of the value 0.84N stated, the cobalt ion content to the extent of plus or minus 15% of the value 0.84N stated, the hypophosphite ion content to the extent of plus 20% or minus 10% from the value 0.145N stated, or the ammonium chloride or other salt content to the extent of plus or minus 25% from the value 1.9 of molar concentration stated. (The percentages here given are to be understood as approximations only.) The pH range, temperature variations and current density variations may be as described above without substantially affecting the results. Under these conditions a coercivity ranging upwardly from 600 oersteds may be secured and a remanence ranging upwardly from 4000 gauss may be obtained.

In terms of a general evaluation of results, the foregoing bath compositions may be summarized in the following tabulation, a good composition being considered as one giving a coercivity of the plating in excess of 500 oersteds, and an acceptable composition being considered as one giving a coercivity of the plating in excess of 400 oersteds.

| | Optimum | Good | Acceptable |
|---|---|---|---|
| $Ni^{++}$ | 0.84 N | 0.71–1.01 N | 0.2–1.7 N. |
| $Co^{++}$ | 0.84 N | 0.71–1.01 N | 0.2–1.0 N. |
| $H_2PO_2^-$ | 0.145 N | 0.130–0.175 N | 0.04–0.20 N. |
| $NH_4Cl$ | 1.9 M | 1.4–2.4 M | 0.3–3.0 M (or equivalent). |

As has been indicated above the deposition (taking into account hydrogen liberation) proceeds at a greater rate than would correspond to the chemical equivalent of the current used and it is, therefore, apparent that the deposition is at least in part due to the presence of the hypophosphite radical which exercises a reducing action on the metal salts. It is known that hypophosphites will effect plating by reduction of metallic salts at higher temperatures without the use of current once the deposition has been started; however, such depositions which occur at elevated temperatures at pH values of 8 to 9 are not satisfactory inasmuch as they do not produce coatings having suitable properties, the coatings requiring heat treatment to attain coercivities of values approximating 450 oersteds and this heat treatment giving rise to non-uniformity in the magnetic properties of the coating throughout the length of a tape. In contrast, the combined electrolytic and chemical deposition produces results as aforementioned, including uniformity of coercivity along the length of the tape and the highly desirable magnetic properties.

What we claim and desire to protect by Letters Patent is:

1. The method for the deposition of a magnetic coating on an electrically conductive carrier comprising subjecting said carrier as cathode to at least partial electrolytic action in an aqueous bath having a pH in the range of 2 to 6 and including as essential constituents nickel ions in a concentration in the range 0.2 to 1.7N, cobalt ions in a concentration in the range 0.2 to 1.0N, and hypophosphite ions in a concentration in the range 0.04 to 0.2N, said electrolytic action being in the presence of the reducing action of the hypophosphite ions on the cobalt and nickel ions.

2. The method for the deposition of a magnetic coating on an electrically conductive carrier comprising subjecting said carrier as cathode to at least partial electrolytic action in an aqueous bath including as essential constituents nickel ions in a concentration in the range 0.2 to 1.7N, cobalt ions in a concentration in the range 0.2 to 1.0N, and hypophosphite ions in a concentration in the range 0.04 to 0.2N, said bath having a pH in the range 3.0 to 4.2, and said electrolytic action being in the presence of the reducing action of the hypophosphite ions on the cobalt and nickel ions.

3. The method for the deposition of a magnetic coating on an electrically conductive carrier comprising subjecting said carrier as cathode to at least partial electrolytic action in an aqueous bath having a pH in the range of 3.0 to 4.2 and including as essential constituents nickel ions in a concentration in the range 0.2 to 1.7N, cobalt ions in a concentration in the range 0.2 to 1.0N, and hypophosphite ions in a concentration in the range 0.04 to 0.2N, the current density being in the range of 15 to 200 amperes per square foot of carrier surface area exposed in the bath, said electrolytic action being in the presence of the reducing action of the hypophosphite ions on the cobalt and nickel ions.

4. The method for the deposition of a magnetic coating on an electrically conductive carrier comprising subjecting said carrier as cathode to at least partial electrolytic action in an aqueous bath containing nickel and cobalt chlorides and including as essential constituents nickel ions in a concentration in the range 0.2 to 1.7N, cobalt ions in a concentration in the range 0.2 to 1.0N, hypophosphite ions in a concentration in the range 0.04 to 0.2N, and ammonium chloride in a concentration in the range 0.3 to 3.0M, said bath having a pH in the range 3.0 to 4.2 and the current density being in the range of 15 to 200 amperes per square foot of carrier surface area exposed in the bath, and said electrolytic action being in the presence of the reducing action of the hypophosphite ions on the cobalt and nickel ions.

5. The method for the deposition of a magnetic coating on an electrically conductive carrier comprising subjecting said carrier as cathode to at least partial electrolytic action in an aqueous bath having a pH in the range of 2 to 6 and including as essential constitutents nickel ions in a concentration in the range 0.7 to 1.0N, cobalt ions in a concentration in the range 0.7 to 1.0N, and hypophosphite ions in a concentration in the range 0.130 to 0.175N, said electrolytic action being in the presence of the reducing action of the hypophospite ions on the cobalt and nickel ions.

6. The method for the deposition of a magnetic coating on an electrically conductive carrier comprising subjecting said carrier as cathode to at least partial electrolytic action in an aqueous bath including as essential constituents nickel ions in a concentration in the range 0.7 to 1.0N, cobalt ions in a concentration in the range 0.7 to 1.0N, and hypophosphite ions in a concentration in the range 0.130 to 0.175N, said bath having a pH in the range of 3.0 to 4.2, and the current density being in the range of 15 to 200 amperes per square foot of carrier surface area exposed in the bath, and said electrolytic action being in the presence of the reducing action of the hypophosphite ions on the cobalt and nickel ions.

7. The method for the deposition of a magnetic coating on an electrically conductive carrier comprising subjecting said carrier as cathode to at least partial electrolytic action in an aqueous bath having a pH in the range of 3.0 to 4.2 and including as essential constituents nickel ions in a concentration in the range 0.7 to 1.0N, cobalt ions in a concentration in the range 0.7 to 1.0N, and hypophosphite ions in a concentration in the range 0.130 to 0.175N, the current density being in the range of 30 to 80 amperes per square foot of carrier surface area exposed in the bath, said electrolytic action being in the presence of the reducing action of the hypophosphite ions on the cobalt and nickel ions.

8. The method for the deposition of a magnetic coating on an electrically conductive carrier comprising subjecting said carrier as cathode to at least partial electrolytic action in an aqueous bath containing nickel and cobalt chlorides and including as essential constituents nickel ions in a concentration in the range of 0.7 to 1.0N cobalt ions in a concentration in the range 0.7 to 1.0N, hydrophosphite ions in a concentration in the range 0.130 to 0.175N, and ammonium chloride in a concentration in the range 0.3 to 3.0M, said bath having a pH in the range of 3.0 to 4.2, and the current density being in the range of 30 to 80 amperes per square foot of carrier surface area exposed in the bath, and said electrolytic action being in the presence of the reducing action of the hypophosphite ions on the cobalt and nickel ions.

9. The method for the deposition of a magnetic coating on an electrically conductive carrier comprising subjecting said carrier as cathode to at least partial electrolytic action in an aqueous bath having a pH in the range of 2 to 6 and including as essential constituents nickel ions in a concentration approximately 0.84N, cobalt ions in a concentration approximately 0.84N, and hypophosphite ions in a concentration approximately 0.145N, said electrolytic action being in the presence of a reducing action of the hypophosphite ions on the cobalt and nickel ions.

10. The method for the deposition of a magnetic coating on an electrically conductive carrier comprising subjecting said carrier as cathode to at least partial electrolytic action in an aqueous bath having a pH in the range of 3.0 to 4.2 and including as essential constituents nickel ions in a concentration approximately 0.84N, cobalt ions in a concentration approximately 0.84N, and hypophosphite ions in a concentration approximately 0.145N, the current density being in the range of 15 to 200 amperes per square foot of carrier surface exposed in the bath, said bath also containing ammonium chloride in a concentration approximately 1.9M, and said electrolytic action being in the presence of the reducing action of the hypophosphite ions on the cobalt and nickel ions.

11. The method for the deposition of a magnetic coating on an electrically conductive carrier comprising subjecting said carrier as cathode to at least partial electrolytic action in an aqueous bath containing nickel and cobalt chlorides and including as essential constituents nickel ions in a concentration approximately 0.84N, cobalt ions in a concentration approximately 0.84N, and hypophosphite ions in a concentration approximately 0.145N, the current density being in the range of 30 to 80 amperes per square foot of carrier surface exposed in the bath, said bath also containing ammonium chloride in a concentration approximately 1.9M, said bath having a pH of approximately 4, and said electrolytic action being in the presence of the reducing action of the hypophosphite ions on the cobalt and nickel ions.

12. The method for the deposition of a magnetic coating on an electrically conductive carrier comprising subjecting said carrier as cathode to at least partial electrolytic action in an aqueous bath containing nickel and cobalt chloride and sodium hypophosphite and characterized by a pH of approximately 4 and including as essential constituents nickel ions in a concentration approximately 0.84N, cobalt ions in a concentration approximately 0.84N, hypophosphite ions in a concentration approximately 0.145N, and ammonium chloride in a concentration approximately 1.9M, the current density being approximately 50 amperes per square foot of carrier surface area exposed in the bath, and said electrolytic action being in the presence of the reducing action of the hypophosphite ions on the cobalt and nickel ions.

THEODORE H. BONN.
DOUGLAS CARY WENDELL, Jr.

References Cited in the file of this patent

UNITED STATES PATENTS

| Number | Name | Date |
|---|---|---|
| 2,430,581 | Pessel | Nov. 11, 1947 |

OTHER REFERENCES

Brenner et al., National Bureau of Standards Research Paper R. P. 1725, vol. 37, July 1946, 1–4.

Young et al., Transactions of the Electrochemical Society vol. 89 (1946) pp. 383–386, 389–396, 399–402.